United States Patent [19]

Sakaida

[11] Patent Number: 5,278,609
[45] Date of Patent: Jan. 11, 1994

[54] MICROFILM READER AND MICROFILM USED THEREIN

[75] Inventor: Shinichi Sakaida, Kanagawa, Japan

[73] Assignee: Fuji Photo Film Co., Ltd., Kanagawa, Japan

[21] Appl. No.: 904,328

[22] Filed: Jun. 25, 1992

[30] Foreign Application Priority Data

Jun. 27, 1991 [JP] Japan ............................... 3-183281

[51] Int. Cl.$^5$ ............................................. G03B 13/28
[52] U.S. Cl. ...................................... 355/45; 355/40; 355/43
[58] Field of Search ..................... 355/40, 41, 43, 44, 355/45

[56] References Cited

U.S. PATENT DOCUMENTS

| | | | |
|---|---|---|---|
| 4,607,950 | 8/1986 | Ishii et al. | 355/41 |
| 4,687,321 | 8/1987 | Itoh | 355/41 |
| 4,693,591 | 9/1987 | Saijo et al. | 355/41 |

Primary Examiner—Monroe H. Hayes
Attorney, Agent, or Firm—Sughrue, Mion, Zinn, Macpeak & Seas

[57] ABSTRACT

A microfilm reader capable of printing out a printed image having the extension same as that of the original image recorded in the microfilm at a reduced size without the need of any instruction from the operator or other means. The microfilm used in the microfilm reader has a mark as an internal standard scale which is photographed on a marginal portion of each frame of the microfilm. The length of the scale mark is read and determined to know magnification ratio necessary for printing out a copy image having the same as the corresponding original, and the magnification ratio is varied by a zoom lens of optical system or an electronic processor for processing image signals. In a modified embodiment, a microfilm having an information mark (i.e., a bar code, numerals, characters or format) indicating the dimensions of the original or reducing ratio at the original image photographing step. Information shown by the information mark is sensed to know the magnification ratio necessary for printing out a copy image having the same as the corresponding original.

20 Claims, 4 Drawing Sheets

MICROFILM READER AND MICROFILM USED THEREIN

BACKGROUND OF THE INVENTION

1. Field of the Invention

The present invention relates generally to a microfilm reader/printer and a microfilm used therein, and particularly to a microfilm reader/printer capable of printing out any desired frame of a microfilm automatically at a magnification so that the printed image has the same dimensions as of the original which has been photographed and recorded in the microfilm. The present invention further relates to a unique microfilm which has a mark or unique arrangement to be conveniently used in the microfilm reader/printer as aforementioned.

2. Prior Art

A microfilm reader/printer has been known in the art, wherein images recorded on a microfilm are read and then printed out to provide an enlarged copy of the image. It is generally desirable that the dimensions of the printed image has the dimensions or extension coextensive with the extension or size of the original document or other material which has been recorded in the microfilm. However, since it is a usual practice that miscellaneous originals, each having a different extension or size, are recorded in one roll of microfilm while respective originals are photographed or otherwise recorded at different reduction ratio, there arises a problem that copy prints each having the extension or size same as that of the corresponding original cannot be made if the recorded images are printed at a constant magnification ratio. As a result, there is a case where the size or extension of the copied image is different from that of the original image.

Accordingly, by the use of such a known microfilm reader/printer, magnification ratio must be determined, for instance, by the operator so that an instruction or command is put in the microfilm reader/printer to render the extension of the copied image co-extensive with that of the original. This requires the operator to take troublesome operations as is the case where the reduction ratios of respective original images are different from each other.

OBJECTS AND SUMMARY OF THE INVENTION

The present invention has been accomplished with the aforementioned view in mind, and a first object thereof is to provide a microfilm reader/printer capable of printing out a printed image having the extension same as that of the original image recorded in the microfilm at a reduced size without the need of any instruction from the operator or other means.

A second object of the invention is to provide a microfilm which is conveniently used with the microfilm reader/printer of the invention.

The first object of this invention is attained by the provision of a microfilm reader comprising a scanner for reading an image recorded on each frame of a microfilm to supply an image signal for printing out the read image, a scale mark being photographed aside the frame to indicate a standard or unit length, said microfilm reader further comprising:

(a) mark length detecting means for reading said scale mark to determine the length of said scale mark;

(b) magnification determining means for referring to the length of said scale mark on said microfilm to determine the magnification necessary for printing out a copy image having dimensions same as those of the original image; and (c) magnification varying means for varying the magnification ratio of the copy image so that the dimensions thereof are co-extensive with the dimensions of the original image;

whereby instructions for producing said copy image having the dimensions co-extensive with the original image are generated.

The magnification determining means may be electronic or optical means.

When the reader of the type as described above is used, the second object of this invention is attained by the provision of a microfilm, characterized in that an internal scale mark indicating the standard length is photographed aside each frame.

According to another aspect of the invention, the first object of the invention attained by the provision of a microfilm reader comprising a scanner for reading an image recorded on each frame of a microfilm to supply an image signal for printing out the read image, an information mark being recorded aside the frame to indicate dimensions of the original image or reducing ratio at the photographing step, said microfilm reader further comprising:

(a) magnification determining means for reading said information mark to determine the magnification ratio necessary for printing out a copy image having the dimensions same as those of the original image; and (b) magnification varying means for varying the magnification ratio of the copy image so that the dimensions thereof are coextensive with those of the original image;

whereby instructions for producing said copy image having the dimensions co-extensive with the original image are generated.

When the microfilm reader of this type is used, the second object of the invention is attained by using a microfilm, characterized in that an information mark indicating the dimensions of the original image or document or reducing ratio at the photographing step is recorded aside each frame.

According to a further aspect of the invention, the first object of the invention is attained alternatively by the provision of a microfilm reader comprising a scanner for reading an image recorded on each frame of a microfilm roll to supply an image signal for printing out the read image, a scale mark being photographed aside the frame to indicate a standard or unit length, said microfilm reader further comprising:

(a) running speed detecting means for detecting the running speed of said microfilm roll across the optical path in an optical system provided for reading said recorded image;

(b) mark sensing means for sensing a scale mark range recorded on each frame of said microfilm to generate an ON signal as long as said scale mark is sensed thereby;

(c) mark length determining means for determining the length of said scale mark while referring to the running speed detected by said running speed detecting means and said ON signal from said mark sensing means;

(d) magnification determining means for referring to the length of said scale mark on said microfilm to determine the magnification ratio necessary for printing out a copy image having dimensions coextensive with the original image; and (e) magnification varying means for varying the magnification ratio of the copy image so that the dimensions thereof is coextensive with the original image;

whereby instructions for producing said copy image having the dimensions co-extensive with the original image are generated.

DETAILED DESCRIPTION OF PREFERRED EMBODIMENTS

The present invention will now be described in detail while referring to presently preferred embodiments.

First Embodiment

Figure 1:
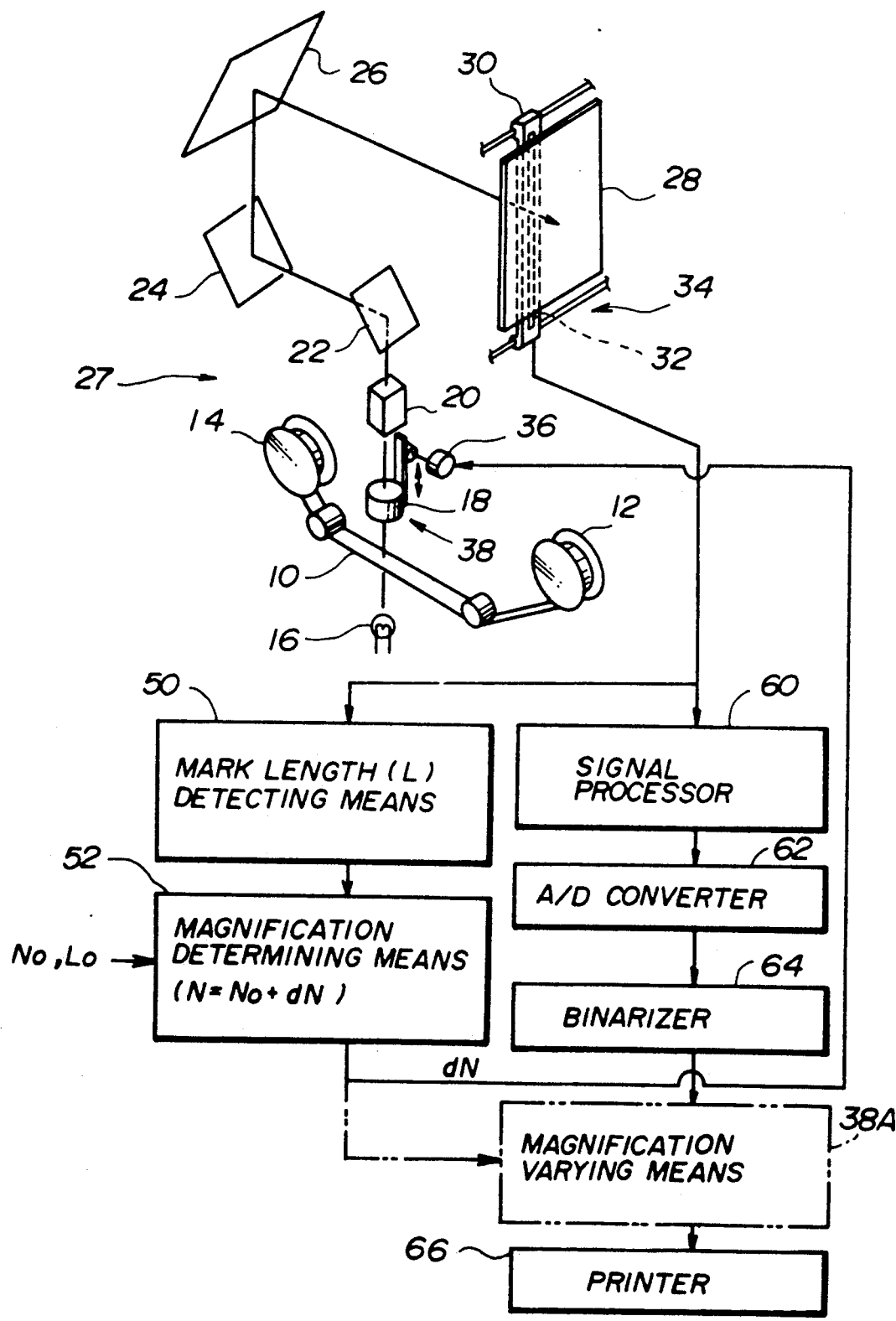
FIG. 1 is a schematic illustration showing the construction of the first embodiment of the invention, wherein some parts thereof are shown in a simplified fashion and the other parts are shown in the form of a block diagram.
Figure 2:
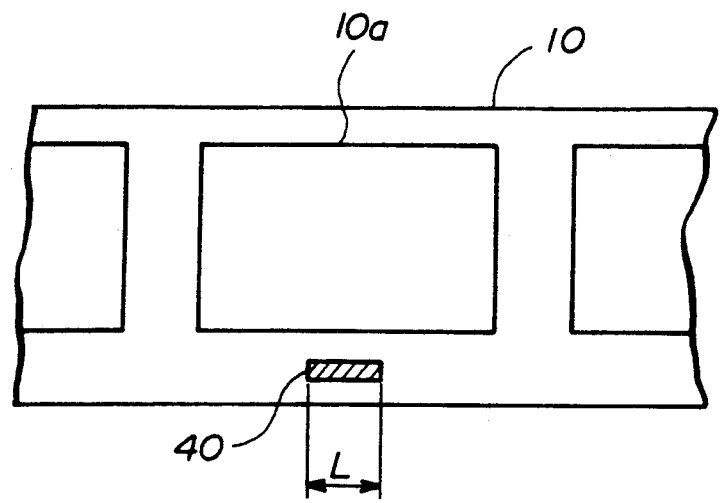
FIG. 2 is a plan view showing a portion of a microfilm which is used with the first embodiment of the invention, scale mark being also recorded by photographing on the microfilm.
Figure 3:
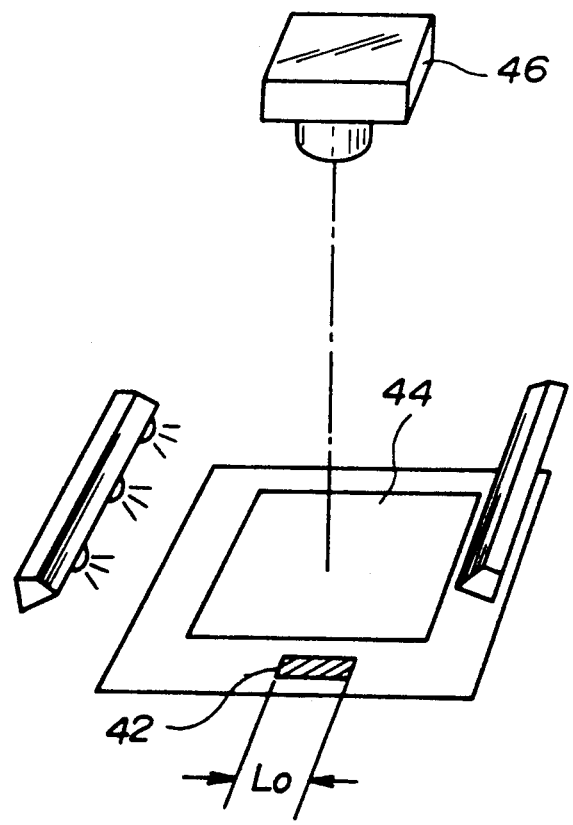
FIG. 3 is an illustration schematically showing the photographing operation for recording an image on a certain frame of a microfilm roll.

Referring to FIGS. 1 to 3, the first embodiment of the invention will be initially described.

In FIG. 1, reference numeral 10 designates a microfilm which runs between one reel 12 and another reel 14. Light from a light source 16 positioned below the microfilm 10 passes through the microfilm 10, and then passes through a projector lens 18, an image rotating prism 20, a reflector mirrors 22, 24, 26 to a screen 28. Namely, an optical system 27 comprising the lens 18, prism 20, mirrors 22, 24 and 26 is provided in this embodiment. A movable plate 30, which is disposed with an elongated side of the screen 28 and is extending along the vertical plane, is attached with a CCD line sensor 32. These movable plate 30 and line sensor 32 constitute a scanner 34. With this construction, the image projected on the screen 28 may be read by reading the portions of the image incident on the line sensor 32 while moving the movable plate 30 along the horizontal plane.

The projector lens 18 is a zoom lens, and the magnification power thereof is variable by means of a servo motor 36. In this embodiment, the optical magnification varying means 38 is comprised of the zoom lens 18 and the servo motor 38.

As shown in FIG. 2, the microfilm 10 conveniently used with this embodiment of the microfilm reader according to the invention has a mark 40 positioned in the bottom margin of each frame within which an image 10a is photographed. As shown in FIG. 3, the mark 40 is photographed as an internal standard scale on the film 10 contained in camera 46 together with the image 10a at the step of photographing the original 44 while placing a plate 42 having a certain standard or unit length $L_0$ in side-by-side relationship with the original. As a result, the length (L) of the scale mark 40 at the recorded frame of the film 10 is reduced by a reduction ratio same as that of the photographed image. In the illustrated embodiment, the magnification ratio N is set so that the length (L) of the recorded image of the scale mark 40 on the microfilm 10 is magnified or enlarged to the length $L_0$, which is same as the unit length ($L_0$) of the plate, on the printed image at the subsequent printing step. An exemplary system which may be used for this purpose will now be described hereinbelow.

Further referring to FIG. 1, reference numeral 50 designates mark length detecting means for reading the length L of the mark 40 on the microfilm frame, the length L being read by the scanner 34. Only the portion corresponding to internal scale the mark 40 is taken from the image signal sequence of the microfilm frame read, for example, by a sensor 32 to determine the recorded length L of the mark 40 on the microfilm. The actual recorded (photographed) length L on the microfilm 10 is determined in consideration of the magnification ratio of the image read by the scanner 34 (the magnification ratio of the projected image on the screen 28). For instance, when the magnification of the projected image on the screen 28 magnified by the entire optical system 27 is set to 100, the actual recorded length L on the microfilm is determined as 1/100 of the length read by the scanner 34.

Reference numeral 52 designates magnification determining means by which the magnification power or ratio necessary for enlarging the read mark length L to the standard length $L_0$. In detail, let the magnifying power of the optical system 27 for reading the length L of the scale mark 40 be N, following equation is obtained.

$$N = N_0 + dN = L_0/L$$

Bearing in mind the equation as set forth in the preceding paragraph, the magnification power is varied, for example, by a servo motor 36 by an extent of $dN = (L_0/L) - N_0$ to bring the dimensions of the image 10a read by the scanner 34 same as the dimensions of the original image 44.

Then the thus read image 10a is printed out responsive to the output signal from the scanner 34. More in detail, the output image signal from the sensor 32 is fed to a signal processor 60, which processes the image signals to remove noise signals, to correct unevenness in intensity of the image, or other necessary processing, and then digitalized by an A/D converter 62 followed by binarization through a binarizing circuit (binarizer) 64. The thus processed image signals are fed to a printer 66 which prints out copy image having the same dimensions as those of the original image.

Although the magnification ratio is varied by the optical magnification varying means 38, which comprises the zoom lens 18 of the optical system 27, in the illustrated embodiment, an electric or electronic processing processor may be used for the same purpose. For example, as shown by the dots-and dash line in FIG. 1, electronic means 38A may be used in place of the optical magnification varying means 38, said electric or electronic means 38A comprises a processor for repeating a portion or portions of said image signals from said scanner along the main and subsidiary directions to increase the magnification ratio for intermittently deleting said image signals along the main and subsidiary directions to decrease the magnification ratio.

In the embodiment described above, the mark 40 showing a standard or unit length L is recorded on the microfilm 10 by photographing a plate 42 having a standard or unit length $L_0$ in the bottom margin of the photographed frame 10a on the microfilm 10. Although the mark 40 which is recorded in the form of an independent mark only to be used as the scale mark in the aforementioned embodiment, the scale mark 40 may be a part of each blip mark which is put for indicating the order of the photographed image 10a respectively.

Figure 4:
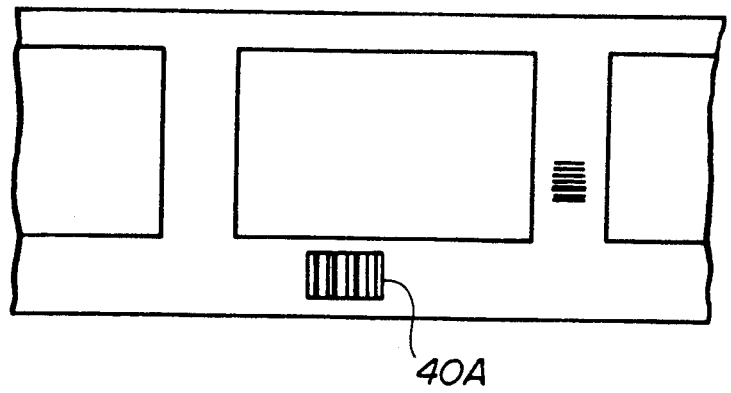
FIG. 4 is a plan view similar to FIG. 2, wherein a bar code is born in a certain frame of the microfilm roll to be used as the mark.
Figure 5:
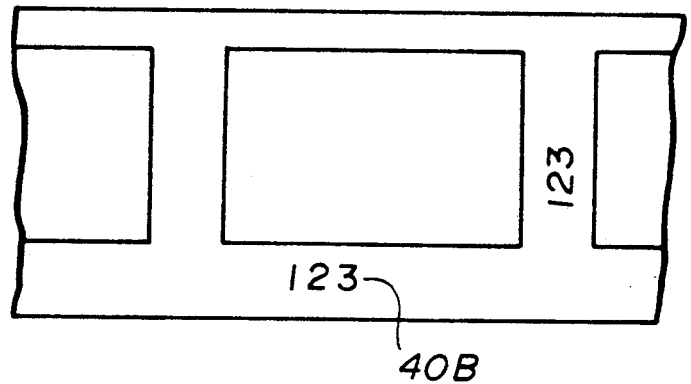
FIG. 5 is a plan view similar to FIG. 2, wherein numerical letters are used as the mark.
Figure 6:
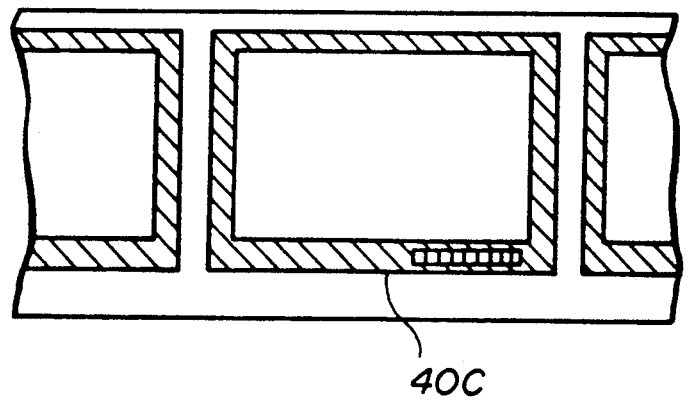
FIG. 6 is a plan view similar to FIG. 2, wherein a form containing therein a format used as the mark.

Alternatively, within the scope of the invention, the scale mark 40 indicating the internal standard length $L_0$ may be replaced by an information mark indicating the dimensions of the original or the reducing ratio at the photographing step so that the suitable magnification power is discriminated. The information mark may be of various form, the examples being a bar code 40A shown in FIG. 4, numeric code 40B shown in FIG. 5, and a specifically formalized code 40C including letters. Such a bar code 40A or numerical code 40B may be recorded not only in the bottom margin of the recorded image 10a but also in either of the side margins (see FIGS. 4 and 5). Of course, a bar code reader is used in place of the mark length detecting means 50 of FIG. 1 when the bar code 40A is attached, a character reader for recognizing the style of characters is used when the numerical code 40B is attached, and a specifically designed recognizing means (format reader) for recognizing the form 40C is used when the form 40C is attached to each frame. Accordingly, when an information mark is used to be read by the microfilm reader of the invention, the magnification determining means is comprised of means for reading out the reduction ratio at the photographing step, the example being a bar code reader, character reader or format reader.

Second Embodiment

Figure 7:
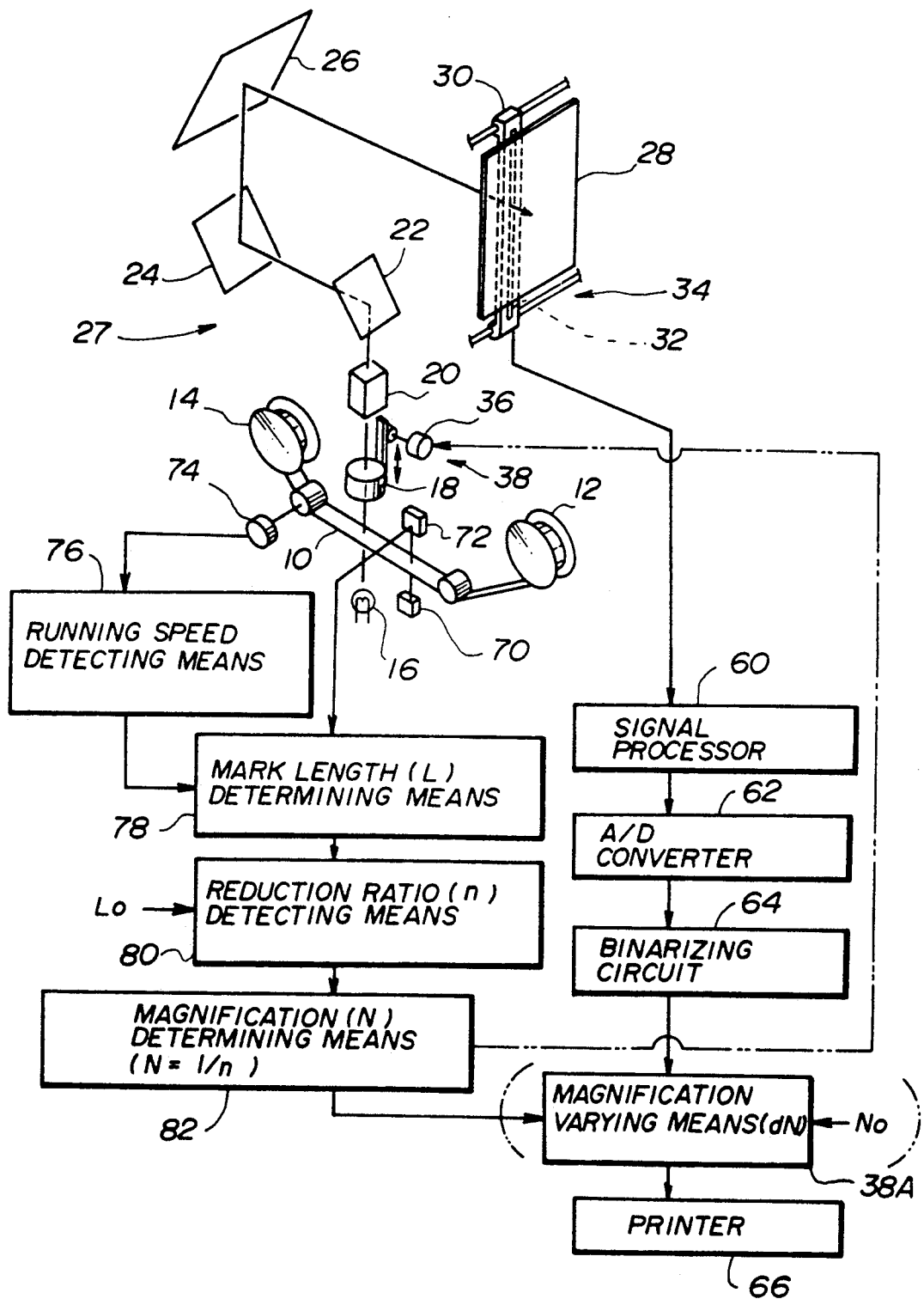
FIG. 7 is a schematic illustration showing the construction of the second embodiment of the invention, wherein some parts are shown in a simplified fashion and the other parts are shown in the form of a diagram.

FIG. 7 shows a further embodiment of the invention. This embodiment is used in combination with a microfilm 10 having plural frames each attached with a mark 40 serving as the internal standard scale. The length L of the mark 40 is measured and the magnification power $N=L_0/L$ required for enlarging the length L to the length$L_0$ of the standard 42 is determined. Referring to FIG. 7, a light emitting unit 70 and a light receiving unit 72 are provided for the detection of a mark 40, these units 70, 72 being disposed above and below the running pass for the mark 40 on the microfilm roll 10 in the opposed relationship with each other. The light receiving unit 72 generates an ON signal as long as it senses the mark 40. Namely, the light receiving unit 72 constitutes mark sensing means for sensing the range of the scale mark 40 recorded on each frame of said microfilm 10.

Reference numeral 74 designates a rotary encoder which detect the rotational speed of a roller rotating while engaging with the surface of the microfilm 10. Reference numeral 76 designates running speed detecting means for detecting the running speed of the microfilm roll 10 by integrating the output pulses from the encoder 74. The ON signal from the light receiver 72 and the output from the encoder 74 indicating the running speed of the microfilm 10 are fed to mark length determining means 78 where the length L of the mark 40 is determined. Since the plate 42 (see FIG. 3) has the standard length $L_0$, the photographed or otherwisely recorded mark 40 on the microfilm 10 has the length L which is reduced by a reduction ratio of $n=L/L_0$. The reduction ratio n is determined by reduction ratio detecting means 80.

As a result, the magnification ratio N necessary for bringing the length$L_0$ of the copied or printed image same as that of the standard length$L_0$ of the plate 42 will be determined as $N=1n=L_0/L$. This magnification ratio is determined by magnification determining means 82. The magnification power or ratio is adjusted so that the recorded image 10a is printed at the proper magnification N. and such an adjustment may be effected by either electrical or optical means which have been described in detail hereinbefore in the description of the first embodiment.

When electrical means is used, image signal is processed by the electric magnification varying means 38A by $dN=N-N_0$ while setting the magnification power of the optical system is set to $N_0$, so that the scanned image is enlarged or reduced in size. On the contrary, when optical means is used as a magnification varying means, the servo motor 36 is controlled to increase or decrease the magnification power of the projecting lens 18. Of course, the electric magnification varying means 38A is not essential, similar to one aspect of the first embodiment, when magnification is effected by optical means 38 including the zoom lens 18.

Other elements of the second embodiment are the same as used in the first embodiment, and thus denoted by same reference numerals and the descriptions thereof will be omitted.

In each of the embodiments described above, the marks, 40, 40A, 40B and 40C may be attached to every images 10a contained in respective frames of the microfilm 10. However, when all images recorded in one microfilm roll 10 have the same size reduction ratio, it suffices that only one mark is attached at the leading part of the microfilm 10.

It should be noted here that the term "microfilm reader" as used throughout the specification and appended claims means a device or system for reading images recorded on a microfilm directly in the recorded size or while enlarging the size thereof. The screen or other display means, as incorporated in the illustrated embodiments for the convenience of the operator for inspection or like operations, is not essentially included in the reader of this invention.

The printer is not essentially incorporated in a single unit. For example, the reader of the invention may be combined, through any known communication line or network, to plural external printers, to any of which the output electrical signal from the reader of the invention is transferred as a digital signal.

Although each of the aforementioned embodiments has been described exemplarily in the type wherein a microfilm roll is used as the recording medium, the invention should be not be limited only to the use of the microfilm roll but is intended to include the use of, for example microfiche or other microfilm card, and various other recording media which are within the common technique knowledge of a person having ordinary skill in the art.

As should be appreciated from the foregoing, since the mark indicating the standard or unit length L and attached to The recorded image is read to determine the magnification ratio necessary for printing out one or more copy images having the dimensions same as those of the original image, every images are printed out to have the same dimensions as those of the original image without the need of manual operation for controlling the magnification power. The magnification ratio varying means may be electric or electronic means, or may be optical means such as the one including a zoom lens.

The marks attached to respective frames of the microfilm may be photographed simultaneously with photographing of the original image, or may be a bar code or numeric code indicating the size reduction ratio and photographed aside each recorded image. Furthermore, a blip mark attached to the recorded image for the identification thereof may contain the information indicating the standard length L.

What is claimed is:

1. A microfilm reader comprising a scanner for reading an image recorded on each frame of a microfilm to supply an image signal for printing out the read image, a scale mark being photographed aside the frame to indicate a standard or unit length, said microfilm reader further comprising:
   (a) mark length detecting means for reading said scale mark to determine the length of said scale mark;
   (b) magnification determining means for determining the magnification necessary for printing out a copy image having dimensions the same as those of the original image based on the thus determined length of said scale mark; and
   (c) magnification varying means for varying the magnification ratio of the copy image based on the thus determined magnification so that the dimensions thereof are co-extensive with the dimensions of the original image;
   whereby an instruction for producing said copy image having the dimensions co-extensive with the original image is generated.

2. The microfilm reader according to claim 1, wherein said magnification varying means is electrical or electronic means for processing the image signal from said scanner so that the printed image has the dimension same as those of the original image.

3. The microfilm reader according to claim 2, wherein said electric or electronic means comprises a processor for repeating a portion or portions of said image signals from said scanner along the main and subsidiary directions to increase the magnification ratio or for intermittently deleting said image signals along the main and subsidiary directions to decrease the magnification ratio.

4. The microfilm reader according to claim 1, wherein said magnification varying means comprises a zoom lens for optically varying the magnification ratio, said zoom lens being disposed across an optical path of an optical system for transmitting the image to said scanner.

5. The microfilm reader according to claim 1, further comprising a printer for printing out said image at the magnification ratio as determined by said magnification determining means.

6. A microfilm adapted to be used with said microfilm reader as claimed in claim 1, characterized in that an internal scale mark indicating the standard length is photographed aside each frame.

7. The microfilm as claimed in claim 6, wherein said scale mark is a part of a blip mark.

8. A microfilm reader comprising a scanner for reading an image recorded on each frame of a microfilm to supply an image signal for printing out the read image, a scale mark being photographed aside the frame to indicate a standard or unit length, said microfilm reader further comprising:
   (a) running speed detecting means for detecting the running speed of said microfilm roll across the optical path in an optical system provided for reading said recorded image;
   (b) mark sensing means for sensing a scale mark range recorded on each frame of said microfilm to generate an ON signal as long as said scale mark is sensed thereby;
   (c) mark length determining means for determining the length of said scale mark based on the running speed detected by said running speed detecting means and said ON signal from said mark sensing means;
   (d) magnification determining means for determining the magnification ratio necessary for printing out a copy image having dimensions coextensive with the original image based on the thus determined length of said scale member; and
   (e) magnification varying means for varying the magnification ratio of the copy image based on the thus determined magnification so that the dimensions thereof is coextensive with the original image;
   whereby an instruction for producing said copy image having the dimensions co-extensive with the original image is generated.

9. The microfilm reader according to claim 8, wherein said magnification varying means is electrical or electronic means for processing the image signal from said scanner so that the copy image has the dimensions same as those of the original image.

10. The microfilm reader according to claim 9, wherein said electric or electronic means comprises a processor for repeating a portion or portions of said image signals from said scanner along the main and subsidiary directions to increase the magnification ratio or for intermittently deleting said image signals along the main and subsidiary directions to decrease the magnification ratio.

11. The microfilm reader according to claim 8, wherein said magnification varying means comprises a zoom lens for optically varying the magnification ratio, said zoom lens being disposed across an optical path of an optical system for transmitting the image to said scanner.

12. The microfilm reader according to claim 8, further comprising a printer for printing out said image at the magnification ratio as determined by said magnification determining means.

13. A microfilm reader comprising a scanner for reading an image recorded on each frame of a microfilm to supply an image signal for printing out the read image, an information mark being recorded aside the frame to indicate dimensions of the original image or reducing ratio at the photographing step, said microfilm reader further comprising:
   (a) magnification determining means for reading said information mark so as to determine the magnification ratio necessary for printing out a copy image having the dimensions same as those of the original image; and (b) magnification varying means for varying the magnification ratio of the copy image so that the dimensions thereof are coextensive with those of the original image;

whereby an instruction for producing said copy image having the dimensions co-extensive with the original image is generated.

14. The microfilm reader according to claim 13, wherein said magnification varying means is electrical or electronic means for processing the image signal from said scanner so that the printed image has the dimensions coextensive with the original image.

15. The microfilm reader according to claim 14, wherein said electric or electronic means comprises a processor for repeating a portion or portions of said image signals from said scanner along the main and subsidiary directions to increase the magnification ratio or for intermittently deleting said image signals along the main and subsidiary directions to decrease the magnification ratio.

16. The microfilm reader according to claim 13, wherein said magnification varying means comprises a zoom lens for optically varying the magnification ratio, said zoom lens being disposed across an optical path of an optical system for transmitting the image to said scanner.

17. The microfilm reader according to claim 13, further comprising a printer for printing out said image at the magnification ratio as determined by said magnification determining means.

18. A microfilm adapted to be used with said microfilm reader as claimed in claim 13, characterized in that an information mark indicating dimensions of the original image or reducing ratio at the photographing step is recorded aside each frame.

19. A microfilm adapted to be used with said microfilm reader as claimed in claim 8, wherein an internal scale mark indicating a standard length is photographed aside each frame.

20. The microfilm as claimed in claim 19, wherein said scale mark is a part of a blip mark.

* * * * *